(12) United States Patent
McCollor et al.

(10) Patent No.: US 7,574,968 B2
(45) Date of Patent: Aug. 18, 2009

(54) METHOD AND APPARATUS FOR CAPTURING GAS PHASE POLLUTANTS SUCH AS SULFUR TRIOXIDE

(75) Inventors: Donald McCollor, Grand Forks, ND (US); Steven Benson, Grand Forks, ND (US); Bernard Hamel, Philadelphia, PA (US); Robin Rhodes, Wellsville, NY (US)

(73) Assignees: Energy & Environmental Research Center, Grand Forks, ND (US); Marsulex Environmental Technologies Corporation, Lebanon, PA (US); Alstom Technolog Ltd, Baden (CH)

( * ) Notice: Subject to any disclaimer, the term of this patent is extended or adjusted under 35 U.S.C. 154(b) by 308 days.

(21) Appl. No.: 10/666,528

(22) Filed: Sep. 19, 2003

(65) Prior Publication Data

US 2005/0053537 A1 Mar. 10, 2005

Related U.S. Application Data

(60) Provisional application No. 60/416,841, filed on Oct. 8, 2002.

(51) Int. Cl.
*B01D 53/38* (2006.01)
*B01D 53/40* (2006.01)
*B01D 53/46* (2006.01)
*B01D 53/50* (2006.01)

(52) U.S. Cl. .............. 110/345; 423/244.01; 431/2; 700/274

(58) Field of Classification Search ......... 110/203–217, 110/344, 345; 431/2–12, 18–90; 423/244.01–244.11; 700/274
See application file for complete search history.

(56) References Cited

U.S. PATENT DOCUMENTS

| | | | | |
|---|---|---|---|---|
| 4,503,785 | A * | 3/1985 | Scocca | 431/2 |
| 4,600,570 | A * | 7/1986 | Lin | 423/244.09 |
| 4,793,268 | A | 12/1988 | Kukin et al. | |
| 4,848,995 | A | 7/1989 | Samish | |
| 5,029,535 | A * | 7/1991 | Krigmont et al. | 110/345 |
| 5,280,756 | A * | 1/1994 | Labbe | 110/191 |
| 5,443,805 | A * | 8/1995 | Beer et al. | 423/235 |
| 5,470,556 | A | 11/1995 | Samish | |
| 5,547,648 | A * | 8/1996 | Buchanan et al. | 423/210 |
| 5,591,417 | A * | 1/1997 | Buchanan et al. | 423/210 |
| 6,203,598 | B1 | 3/2001 | Hasegawa et al. | |
| 6,206,685 | B1 | 3/2001 | Zamansky et al. | |
| 6,579,507 | B2 * | 6/2003 | Pahlman et al. | 423/210 |
| 6,939,523 | B2 * | 9/2005 | D'Alesandro | 423/243.08 |
| 6,997,119 | B2 * | 2/2006 | Radway | 110/343 |
| 2004/0009443 | A1 * | 1/2004 | Loving | 431/19 |

FOREIGN PATENT DOCUMENTS

WO WO 94/26659 11/1994
WO WO 03/039737 5/2003

* cited by examiner

*Primary Examiner*—Wayne Langel
(74) *Attorney, Agent, or Firm*—Johnson & Associates (57) ABSTRACT

A method and apparatus is provided for use in combustion system for capturing gas phase pollutants such as $SO_3$. In one example, the invention uses a computer model to model the combustion system. Particles are injected into the combustion system to capture the gas phase pollutants. The model is used to determine the injection location, as well as the size and amount of the particles to be injected.

39 Claims, 6 Drawing Sheets

METHOD AND APPARATUS FOR CAPTURING GAS PHASE POLLUTANTS SUCH AS SULFUR TRIOXIDE

CROSS REFERENCE TO RELATED APPLICATIONS

This application claims priority under 35 U.S.C. § 119 to co-pending, commonly owned U.S. provisional patent application Ser. No. 60/416,841 filed on Oct. 8, 2002, entitled "SULFUR TRIOXIDE REDUCTION IN AIR PREHEATERS", which is incorporated by reference herein.

FIELD OF THE INVENTION

This invention relates to the field of combustion systems. In particular, this invention is drawn to techniques for capturing gas phase pollutants, such as sulfur trioxide, in combustion systems.

BACKGROUND OF THE INVENTION

A typical combustion system includes a furnace or combustion chamber for burning fuel and an air preheater for heating an air stream before being injected into the furnace. In many applications, the air preheater heats the air using exiting flue gas. When fuel is burned in the combustion system, various gas phase pollutants are generated that must be minimized. Examples of gas phase pollutants include, but are not limited to, Sulfur trioxide, Mercury, and other volatile elements, inorganic and organic compounds.

Sulfur trioxide ($SO_3$) is formed in boilers by the oxidation of sulfur compounds present in the fuel. $SO_3$ is very reactive and extremely hygroscopic. $SO_3$ readily combines with water vapor to form a sulfuric acid aerosol. At moderate stack concentrations, these aerosols form visible stack plumes with potential environmental hazard issues. The formation of $SO_3$ in a flue gas stream is dependent upon various factors: fuel composition and preparation, boiler design and operating conditions, and the presence of a selective catalytic reduction (SCR) system for $NO_x$ reduction. The interaction of $SO_3$ with ash particles through the air preheater is dependent upon the concentration of $SO_3$ in the gas phase, the size distribution and population of the ash particles, and the temperature gradients and heat-transfer surface characteristics within the air preheater.

SUMMARY OF THE INVENTION

One embodiment of the invention provides a method of capturing gas phase pollutants in a combustion system having an air preheater comprising the steps of: creating a model of the combustion system; using the model to determine optimal locations to inject particles into the combustion system; and injecting particles into the combustion system at one or more of the determined locations.

Another embodiment of the invention provides a method of capturing gas phase pollutants in a combustion system comprising the steps of: creating a computer model of the combustion system for modeling various parameters in the combustion system, including flow patterns, temperature patterns, and condensation reactions; using the computer model to predict the impact on gas phase pollutants by injecting particles into the combustion system, and to predict the impact on gas phase pollutants by the particle size distribution and the amount of injected particles in order to reduce the pollutants to a desired level; using the computer model to determine one or more optimal locations in the combustion system for the injection of particles; using the computer model to determine an optimal size and amount of particles to be injected; and injecting the determined amount and size of particles into the combustion system at one or more of the determined locations to capture gas phase pollutants in the combustion system.

Another embodiment of the invention provides a combustion system comprising: a furnace; an air preheater for preheating a combustion air stream in the combustion system; a computer model designed to model the operation of the combustion system, including the impact of the injection of particles into the combustion system; and a particle injector for injecting particles into the combustion system.

Another embodiment of the invention provides a method of capturing gas phase pollutants in a combustion system comprising the step of: injecting particles into the combustion system at one or more locations, wherein the size of the particles and the location of the injection are chosen such that pollutant condensation occurs primarily on the injected particles.

Another embodiment of the invention provides a method of capturing gas phase pollutants in a combustion system having an air preheater comprising the step of: performing modifications to the combustion system, wherein the size distribution of the resultant ash particles has an increased population of fine particles below 5 microns.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Generally, the present invention provides techniques for capturing gas phase pollutants in a combustion system by injecting fine particles into the combustion system using a particle injector. The particles are injected at desired location(s), preferably locations where the particles will capture the pollutants in the most efficient manner (e.g., at locations where the temperature patterns are such that pollutant condensation starts to occur). Similarly, the size and amount of particles can be chosen to most efficiently capture pollutants (e.g., using iterations to reduce the pollutant concentration to an acceptable level). Following is one example of how the invention can be used to capture gas phase pollutants, such as $SO_3$, in a combustion system.

Controlled capture of $SO_3$ in the flue gas stream across an air preheater of a combustion system can be obtained through injection of fine particles upstream and/or within the air preheater. Of course, other injection locations may also be used, depending on the particular combustion system. The invention uses computer model simulations to determine the amount and location of injected material. The injected material can consist of a fine fraction of fly ash, finely ground minerals or alkali and alkaline-earth compounds, aerosols, aqueous solutions of salts, and mists, for example. As an alternative to particle injection, modifications to the system, such as increasing the fineness of the fuel, cofiring with other fuels, and combustion modifications, can be made to increase the fine ash fraction in the flue gas entering the air preheater. The air preheater provides turbulent mixing of the injected materials to ensure maximum contact of the entrained fine particles with the flue gas stream. The capture of the $SO_3$ occurs within and/or downstream of the air preheater. The temperature for interaction of $SO_3$ with the fine particles is dependent upon the $SO_3$ concentration and the quantity and size distribution of particles in the flue gas stream. The flue gases in the air preheater must be cooled sufficiently to allow for condensation of the $SO_3$. The fine particles provide nucleation sites for enhanced condensation of the $SO_3$, and once condensed can react with alkaline compounds, resulting in neutralization of the acid.

In one example, the determination of particle size and amount, as well as the determination of injection locations, is made using computer models. In other examples, these determinations can be made empirically by trial and error while measuring pollutant levels based on previous experience. Examples of how computer models may be used follows. In one example, a computer model is developed that allows for the determination of the amount of $SO_3$ transformations and interactions across an air preheater to assist in developing strategies to minimize the level of $SO_3$ released to the environment. A predictive model was developed utilizing an ash formation model to predict the particle loading entering the air preheater, a computational fluid dynamics code to predict velocity and temperature profiles, a reaction kinetics code to predict $SO_3$ formation in the gas phase, particle impaction and accumulation rates in air preheaters and, finally, the prediction of $SO_3$ leaving the air preheater. Examples of these models are described in detail below. These tools were applied to develop solutions to $SO_3$ emission problems in boilers or other combustion systems. In the past, this combination of models and components has not been applied to the understanding of the fate of $SO_3$ leading to solutions to $SO_3$ emission problems. The results of the modeling indicate a significant capture of $SO_3$ in the presence of fine particles less than approximately 5 µm in diameter as the $SO_3$-containing flue gases pass through the air preheater. In some exemplary applications, small particles typically less than 5 µm in size reduce the levels of $SO_3$ across air preheaters in the temperature range of 350° down to 200° F. and lower. The level of $SO_3$ capture can be as high as 95% with the controlled introduction of small particles. The capture of $SO_3$ is controlled through the introduction of fly ash, injection of an aerosol, injection of an aqueous solution containing a soluble salt, and mists. The air preheater allows for mixing and interaction of the small particles, providing a suitable temperature range and environment for chemical and physical sorption processes. These results have been corroborated by field observation. This finding provides a unique opportunity to capture the level of $SO_3$ in the flue gas as it passes through an air preheater.

The chemical and physical transformations of the inorganic components of coal to ash or slag during combustion depend upon the design of the system, operating conditions, and fuel composition. During the combustion and gas-cooling process, the inorganic species undergo a complex series of chemical and physical transformations. The inorganic species are transformed into inorganic vapors, liquids, and solids during the initial combustion phase. These ash precursor materials range from vapors to solid particles. These ash materials are cooled as a result of heat transfer as they are transported with the bulk gas flow through the combustion system. The cooling process causes the vapor-phase inorganic components to condense and the liquid-phase components to solidify. Studies of the final ash product (fly ash) indicate a multimodal size distribution. The submicron-sized particles form as a result of homogeneous condensation of flame-volatilized species. Recent studies have indicated an intermediate-size mode of ash at about 1 µm that is produced when coal is combusted. Flame-volatilized species may also condense heterogeneously on the surfaces of larger particles. The larger particles, sometimes referred to as residual ash, are largely derived from mineral grains. The composition and size distribution of the larger particles result from transformations or interactions between discrete mineral grains in higher-rank coals. In lower-rank coals, the interaction of the organically associated elements with mineral grains occurs as well as mineral-mineral interactions.

Following is a brief description of an example of a group of computer tools that may be used with the present invention to model a combustion system. A more detailed description of the models and the calculations they perform will follow the brief description. Other computer models performing similar functions could also be used.

A first computer program (known as ATRAN) was developed by the Energy & Environmental Research Center (EERC) to predict the particle size and composition distribution (PSCD) of ash produced during the combustion of coal. This technique uses advanced analytical characterization data, boiler parameters, and a detailed knowledge of the chemical and physical transformations of inorganic components during combustion to predict the PSCD of the resulting ash. The PSCD of the ash directly impacts deposit growth, deposit strength development, ash collectability, and interaction with gas-phase species. To help verify the ATRAN model for use with the present invention, entrained ash was sampled from the convective passes of full-scale utility boilers. The PSCD of the entrained ash produced by combusting a Powder River Basin sub-bituminous coal was compared to the predictions made with ATRAN. The PSCD was calculated for 20,000 particles and then binned by size and composition for comparison with ash collected during field testing. In all, ash samples were compared for four different coals in both tangentially fired and cyclone-fired boilers for a total of six sampled ashes. In all six cases, the ATRAN code results compared favorably in both particle size and composition distribution.

An aerosol formation and evolution model component was added to the ATRAN model to predict submicron formation and growth. ATRAN was coupled with submicron particle formation calculations to model aerosol formation by homogeneous nucleation and growth by heterogeneous condensation and coagulation.

Another computer program that may be used with the present invention is a commercially available program known as Chemkin®, which is a chemical reaction kinetics computer code that provides a means to determine the rates of reaction of various components in flue gas systems. Chemkin® is used to determine the rates of $SO_3$ formation upstream of the air preheater.

Another computer program that may be used with the present invention is a commercially available program known as FLUENT®, which is a computational fluid dynamics (CFD) code. FLUENT® is used to model flow patterns through selected devices. The CFD model is able to model the flow of gas-phase and particulate-phase materials and provide the velocity and temperature distribution through heat exchange devices such as air preheaters. The geometries and other conditions can be changed to determine the impacts of species mixing and impingement of particles suspended in the flue gas streams on the walls. This information is used to determine the impacts of particles as well as particle sizes on the fate of $SO_3$ in the air preheater.

FIGS. 1-5 are diagrams illustrating exemplary calculations that a computer model may perform when used with the present invention. Of course, a computer model used with the present invention may utilize other calculations as well.

Figure 1:
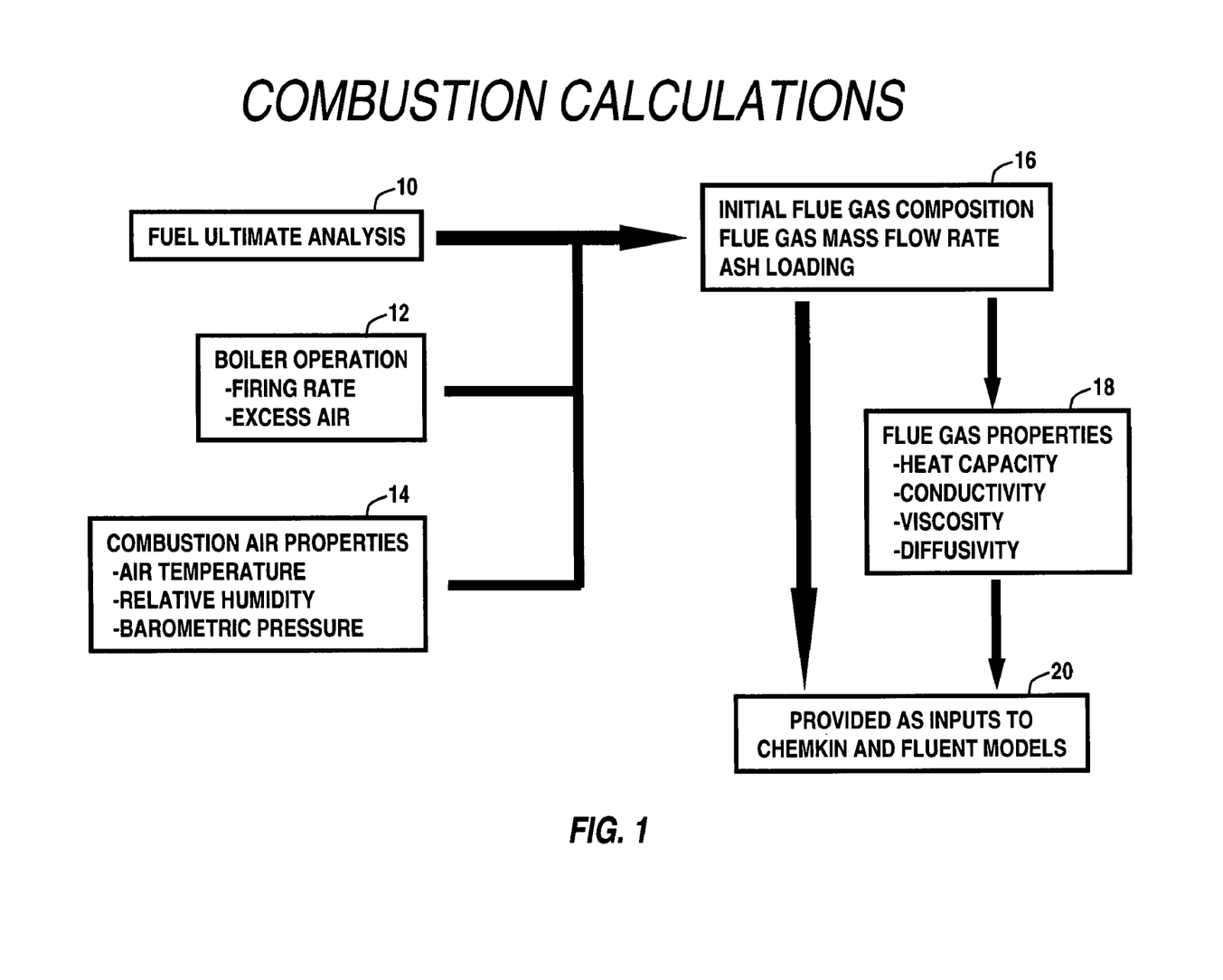
FIG. 1 is a diagram illustrating combustion calculations.

FIG. 1 is a diagram illustrating combustion calculations that may be used with the present invention. In this set of calculations, the fuel ultimate analysis (box 10) (e.g., carbon, hydrogen, nitrogen, sulfur, oxygen, and ash weight percentages), along with some combustor operating parameters (box 12) (e.g., fuel firing rate and combustion air in excess of that needed for complete combustion), and combustion air properties (box 14) (e.g., barometric pressure, air temperature, and relative humidity), are used to calculate the initial flue gas composition (box 16) (percentage of Ar, $N_2$, $O_2$, $CO_2$, $NO_2$, $SO_2$, and $H_2O$), mass flow rate, and ash loading after combustion. In one example, this is a standard calculation which assumes all fuel sulfur is oxidized to $SO_2$. Some additional calculations are performed to obtain flue gas properties (box 18) based on the gas composition (heat capacity, conductivity, viscosity, diffusivity). These values are provided as inputs (box 20) to subsequent Chemkin® (FIG. 3) and FLUENT® (FIG. 4) calculations.

Figure 2:
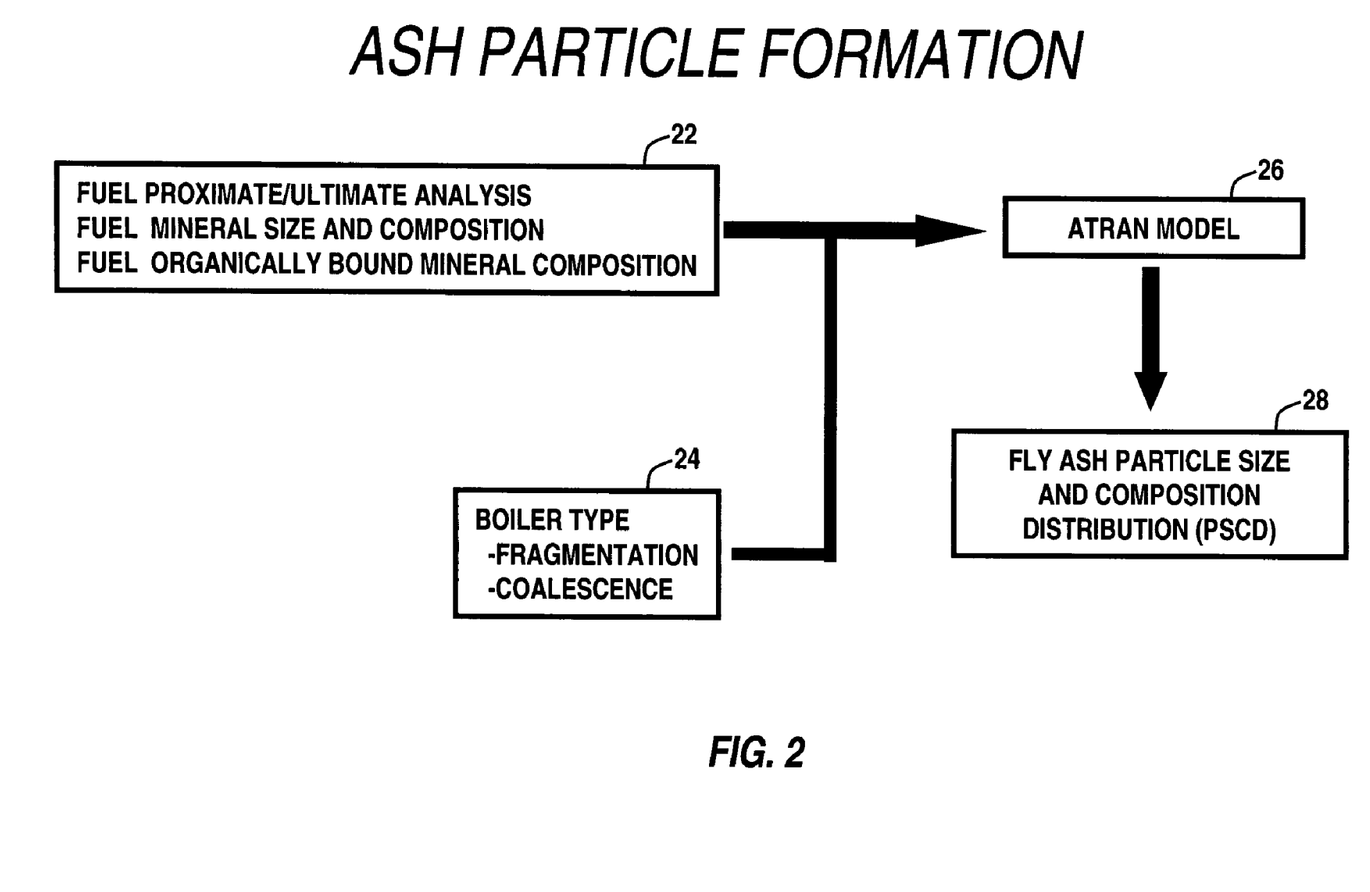
FIG. 2 is a diagram illustrating calculations relating to the modeling of ash particle formation.

FIG. 2 is a diagram illustrating calculations relating to the modeling of ash particle formation that may be used with the present invention. In these calculations, the fuel proximate (box 22) (moisture, volatile matter, fixed carbon, and ash weight percentages) and ultimate analysis (carbon, hydrogen, nitrogen, sulfur, oxygen, and ash weight percentages), fuel mineral size and composition (computer controlled scanning electron microscopy [CCSEM] analysis), and the organically bound mineral composition (chemical fractionation analysis) along with the boiler type (box 24) (which is used to select ash fragmentation and coalescence constants) are inputs to the ATRAN model of ash particle formation (box 26). The model uses this information to calculate the fly ash PSCD (box 28). The calculated PSCD is provided as an input to the subsequent FLUENT® (FIG. 4) and General Dynamic Equation (GDE) (FIG. 5) calculations.

Figure 3:
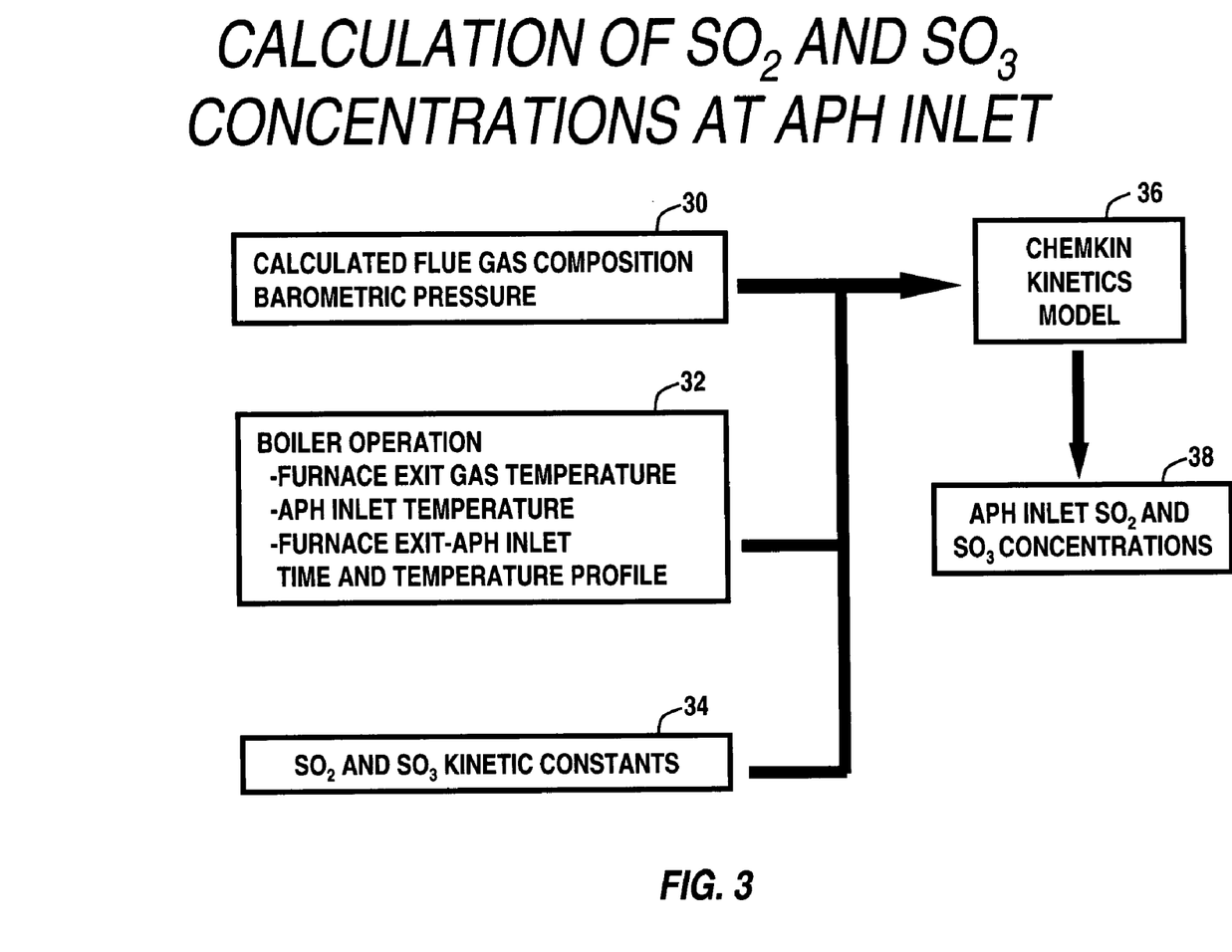
FIG. 3 is a diagram illustrating calculations relating to the modeling of $SO_2$ and $SO_3$ concentrations at the APH inlet.

FIG. 3 is a diagram illustrating calculations relating to the modeling of $SO_2$ and $SO_3$ concentrations at the Air Preheater (APH) inlet that may be used with the present invention. In one example, these calculations are performed using the Chemkin® model. In these calculations, the calculated flue gas composition and barometric pressure (box 30) from the calculations illustrated in FIG. 1, combustor operating conditions (box 32) (furnace exit gas temperature, APH inlet temperature, and the residence time and temperature profile between furnace exit and APH inlet), along with $SO_2$ and $SO_3$ kinetic constants (box 34) (obtained from the scientific literature) are all inputs to the Chemkin® chemical kinetics model (box 36). The model calculates the gas phase concentrations of $SO_2$ and $SO_3$ and liquid $H_2SO_4$ expected at the APH inlet (box 38). These calculations are used in the subsequent GDE calculations (FIG. 5).

Figure 4:
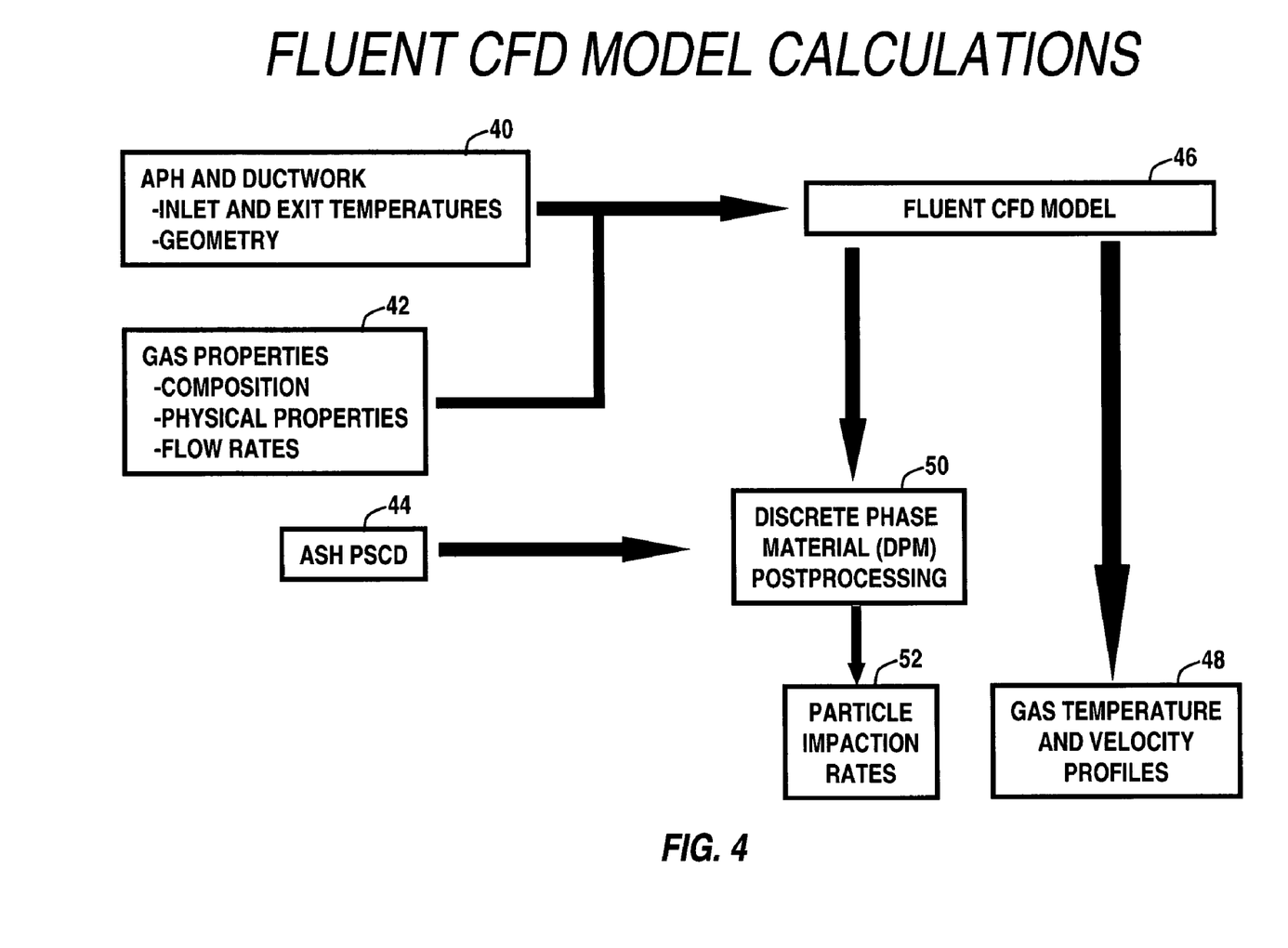
FIG. 4 is a diagram illustrating calculations relating to the FLUENT® CFD model.

FIG. 4 is a diagram illustrating calculations relating to the FLUENT® CFD model. In these calculations, the geometry of the APH and ductwork downstream between the APH as well as the gas temperatures at the inlet and outlet of the APH (box 40), along with the flue gas composition, flow rate and physical properties (box 42) (from FIG. 1) are provided as inputs to the FLUENT® CFD model (box 46). The FLUENT® model calculates the three dimensional velocity and temperature profile (box 48) of the flue gas through the APH and downstream ductwork. In a post-processing calculation, FLUENT® calculates the trajectories of discrete phase material (DPM) (i.e. fly ash and sorbent particles) (box 50) through the APH and ductwork along with particle impaction rates (box 52) on the APH and duct surfaces, which is used in the subsequent GDE calculations (FIG. 5). When calculating the particle impaction rates, the Ash PSCD (box 44), is used in conjunction with the FLUENT® DPM results.

Figure 5:
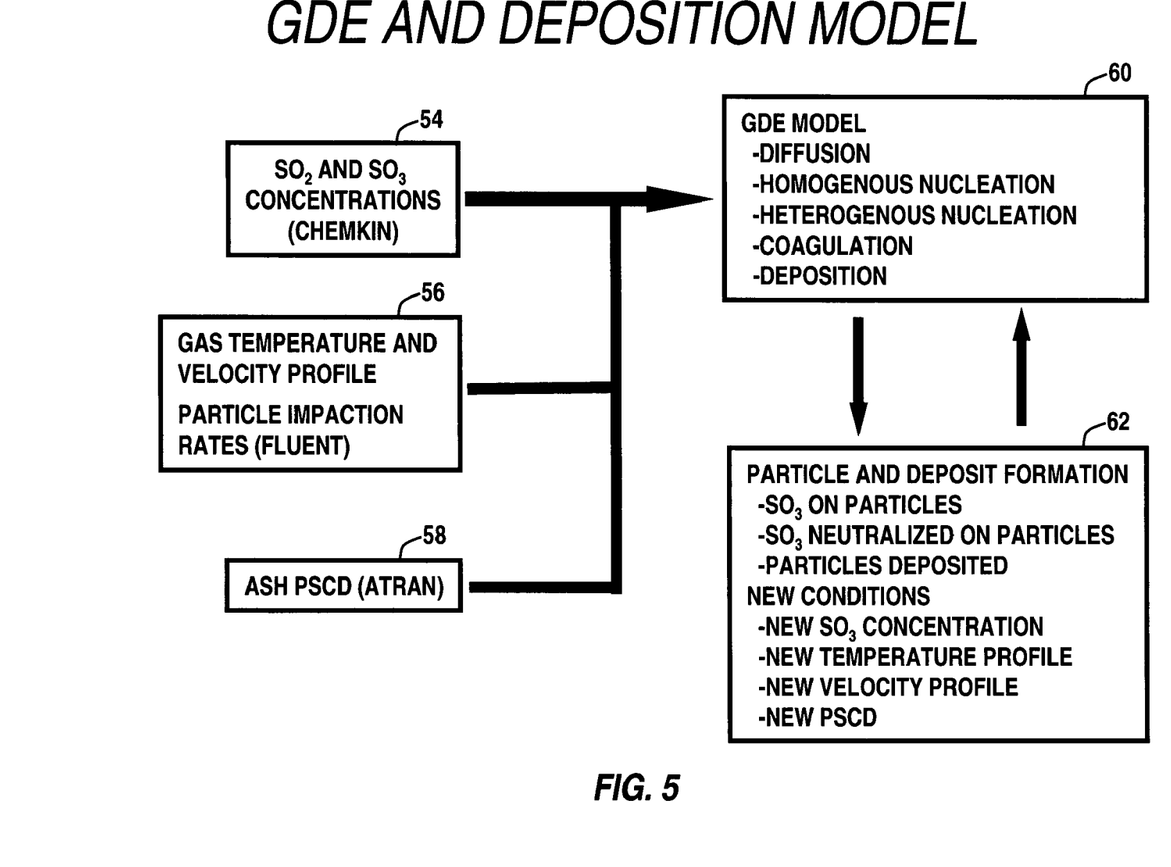
FIG. 5 is a diagram illustrating calculations relating to the GDE and Deposition Model.

FIG. 5 is a diagram illustrating calculations relating to the GDE and Deposition Model. In these calculations, the $SO_2$ and $SO_3$ concentration (box 54) (from FIG. 3), the gas temperature and velocity profile and particle impaction rates (box 56) (from FIG. 4), and the fly ash PSCD (box 58) (from FIG. 2) are provided as inputs to the GDE model (box 60). At a given point along the path through the APH and ductwork, the GDE model calculates the diffusion rate of $SO_3$ to particles, the condensation of $SO_3$ on particles (heterogeneous nucleation) and as liquid droplets (homogenous nucleation), the coagulation of smaller ash particles on larger particles, and particle deposition on APH or duct surfaces.

A second set of calculations (box 62) tabulates the amount of $SO_3$ on particles, the amount of $SO_3$ on particles that is neutralized, and the amount of particles and $SO_3$ deposited on APH and ductwork surfaces. A new $SO_3$ gas concentration and PSCD is then calculated reflecting these changes. Another temperature and velocity profile is input further along the path through the APH and ductwork, and the GDE model calculations are performed again using these new values. These iterative calculations continue from the chosen starting point along the path through the APH and downstream ductwork to the entrance of the particulate control device.

The computer model described above can be used to find optimal locations for the injection of fine particles into a combustion system for the capture of gas phase pollutants. The model can also be used to determine optimal size and amounts of particles to be injected. Following is one specific example showing the results obtained with the present invention. Other models that employ the same calculations could be used.

The computer model developed for the invention (described above) was used to predict the impacts of PSCD on the abundance of $SO_3$ in coal combustion-derived flue gas stream in air preheaters. The computer model was tested using data from a full-scale power plant. The composition of the coals and selected conditions that were used in the test are shown in Table 1 below. Table 1 first shows the composition of the coal, as a percentage of weight. Table 1 also shows other inputs used, such as the maximum coal fire rate, percentage of maximum coal fire rate, excess air percentage, atmospheric pressure, ambient temperature, and relative humidity.

TABLE 1

| Coal Analysis and Plant Operating Conditions | |
|---|---|
| Coal Ultimate Analysis, wt % | |
| Hydrogen | 4.99 |
| Carbon | 64.73 |
| Nitrogen | 0.98 |

TABLE 1-continued

Coal Analysis and Plant Operating Conditions

| | |
|---|---|
| Sulfur | 1.07 |
| Oxygen | 14.94 |
| Ash | 13.29 |
| Max. Coal Fire Rate, kg/s | 25 |
| % of Max. Coal Fire Rate | 100 |
| Excess Air, % | 20 |
| Atmospheric Pressure, atm | 1 |
| Ambient Temperature, ° K | 294 |
| Relative Humidity, % | 50 |

Figure 6:
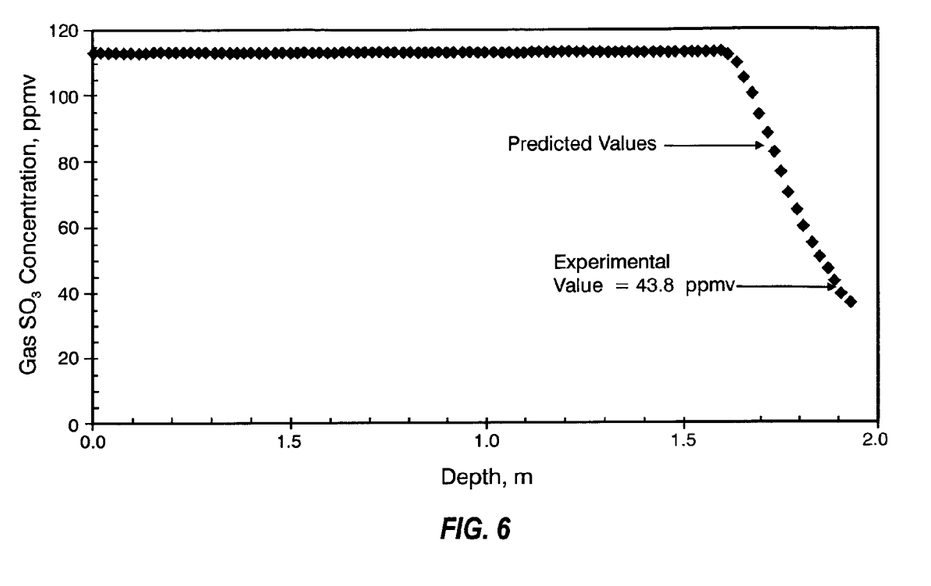
FIG. 6 shows a comparison between actual $SO_3$ levels, and the $SO_3$ levels predicted by the computer model.

This information, combined with mineral size and composition analyses were used as inputs to determine the amount of $SO_3$ transformations and interactions across an air preheater. The predictive model utilizes the ash formation model to predict the PSCD entering the air preheater, a CFD code to predict the velocity and temperature profiles, a reaction kinetics code to predict the formation of $SO_3$ in the gas phase, an aerosol formation model for submicron size distributions of condensed phases, particle impaction and accumulation rates in air preheaters and, finally, the prediction of $SO_3$ leaving the air preheater. FIG. 6 shows a comparison between actual $SO_3$ levels, and the $SO_3$ levels predicted by the computer model. The modeling efforts illustrated by FIG. 6 indicate good agreement between predicted $SO_3$ levels (the plotted data) and the actual measured $SO_3$ levels (shown by the arrow at 43.8 ppmv) exiting the air preheater at a full-scale power plant.

Figure 7:
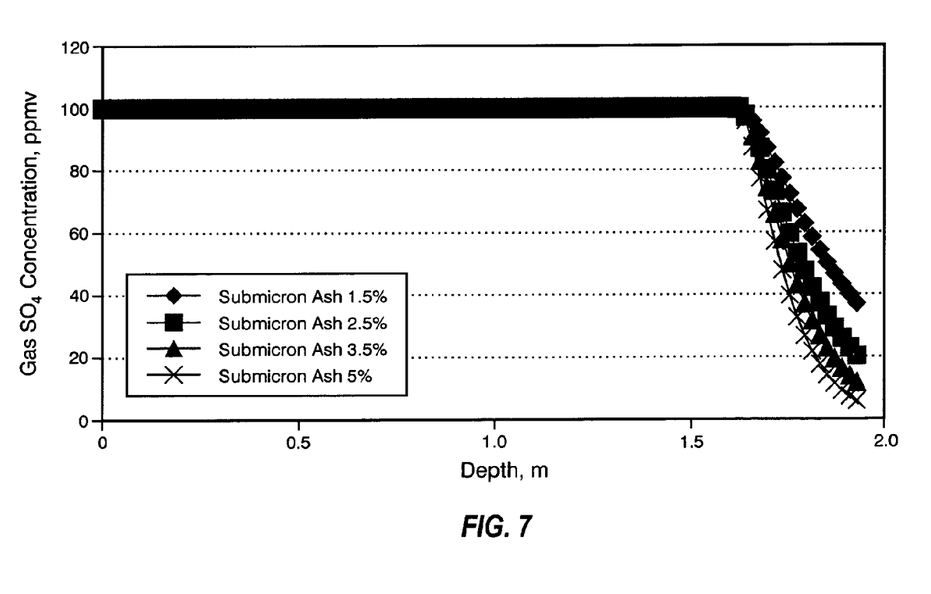
FIG. 7 illustrates $SO_3$ capture over various sized fine particles in the air preheater, as predicted by the model.

FIG. 7 illustrates $SO_3$ capture over various sized fine particles in the air preheater, as predicted by the model. FIG. 7 includes 5 curves showing the gas $SO_3$ concentration versus depth of four sizes (shown as a percentage of weight) of submicron ash. The data in FIG. 7 was generated using model simulations conducted by injecting particles less than 5 μm in diameter into the $SO_3$— containing flue gases as they passed through the air preheater. As shown in FIG. 7, significant capture of $SO_3$ were found with injection of small particles. A 5% increase by weight in the small particles resulted in a 95% capture of $SO_3$. This finding provides a unique opportunity to reduce the level of $SO_3$ through the injection of fine particles in the flue gas as it passes through an air preheater.

As mentioned above, the model is used by the present invention to determine injection locations, as well as the size and amount of particles to be injected. These determinations can be made in any desired manner. For example, to determine one or more optimal injection locations, a temperature profile generated from the model can reveal locations where pollutant condensation starts to occur. It is usually desirable to use a location such that pollution condensation occurs primarily on the injected particles. Typically, the optimal locations will be in the proximity of the air preheaters, but the optimal locations will vary, depending on various factors in the combustion system and the pollutant of interest. In another example, to determine the optimum particle concentration, size, and amount, iterations can be run using the model to determine when pollutant concentration is reduced to an acceptable level. In another example, with or without using a model, pollutant removal can be measured experimentally using various locations and/or various particle concentrations, sizes and amounts. When the pollutant level is measured to be an acceptable level, the corresponding injection location and particle concentration, size and amount can be used.

In the preceding detailed description, the invention is described with reference to specific exemplary embodiments thereof. Various modifications and changes may be made thereto without departing from the broader spirit and scope of the invention as set forth in the claims. The specification and drawings are, accordingly, to be regarded in an illustrative rather than a restrictive sense.

What is claimed is:

1. A method of capturing gas phase pollutants in a combustion system comprising the steps of:
   modeling flow patterns of the combustion system;
   modeling temperature patterns of the combustion system;
   modeling condensation reactions of the combustion system;
   using the modeled flow patterns, temperature patterns, and modeled condensation reactions to predict the impact on gas phase pollutants from injecting particles into the combustion system, and to predict the impact on gas phase pollutants by the particle size distribution and the amount of injected particles in order to reduce the pollutants to a desired level;
   using the modeled flow patterns, modeled temperature patterns, and modeled condensation reactions to determine one or more optimal locations in the combustion system for the injection of particles;
   using the modeled flow patterns, modeled temperature patterns, and modeled condensation reactions to determine an optimal size and amount of particles to be injected; and
   injecting the determined amount and size of particles into the combustion system at one or more of the determined locations to capture gas phase pollutants in the combustion system.

2. The method of claim 1, wherein the combustion system includes an air preheater.

3. The method of claim 1, wherein the gas phase pollutants include sulfur trioxide.

4. The method of claim 3, wherein the temperature gradients within the air preheater are modified to increase the rate of sulfur trioxide condensation on ash particles as they pass through the air preheater and continue to travel downstream.

5. The method of claim 1, further comprising taking into account the fuel type used in the combustion system.

6. The method of claim 1, further comprising taking into account the geometry of the combustion system.

7. The method of claim 1, wherein the optimal locations are determined based on where pollutant condensation occurs in the combustion system.

8. The method of claim 1, further comprising determining rates of reaction of components.

9. A method of capturing gas phase pollutants in a combustion system downstream of a combustion zone comprising:
   predicting the temperature gradient and location in the combustion system where the critical phenomena of condensation of gas phase pollutants occur;
   using the predicted temperature gradient and location to predict the effect of modifications to the combustion system, wherein the size distribution of resultant ash particles in the combustion system has an increased population of fine particles below 5 microns compared to the combustion system without the modifications; and
   injecting particles into the combustion system at one or more locations.

10. The method of claim 9, wherein the gas phase pollutants include sulfur trioxide.

11. The method of claim 10, wherein the temperature gradients within the air preheater are modified to increase the rate of sulfur trioxide condensation on ash particles as they pass through the air preheater and continue to travel downstream.

12. The method of claim 9, wherein various parameters of the combustion system are modeled.

13. The method of claim 12, wherein the parameters include particle formation, temperature patterns, rates of reaction of components, and condensation reactions of pollutants.

14. The method of claim 12, wherein the parameters include the geometry of the combustion system.

15. The method of claim 9, wherein an air preheater is used to modify the temperature of flue gas traveling through the air preheater and downstream ductwork.

16. A method of capturing gas phase pollutants in a combustion system comprising:
   predicting the temperature gradient and location in the combustion system where the critical phenomena of condensation of gas phase pollutants occur;
   using the predicted temperature gradient and location to configure the combustion system, including determining optimal distribution of particles and particle injection locations in the combustion system to enhance the heterogeneous condensation of gas phase pollutants onto injected particles; and
   injecting particles into the combustion system at one or more locations, wherein the size of the particles and the location of the injection are chosen such that pollutant condensation occurs primarily on the injected particles.

17. The method of claim 16, wherein the location of the injection are determined based on where pollutant condensation occurs in the combustion system.

18. The method of claim 16, wherein the chosen location of the injection are determined by measuring gas phase pollutant capture at various injection locations.

19. The method of claim 16, wherein the gas phase pollutants include sulfur trioxide.

20. The method of claim 19, wherein the temperature gradients within the air preheater are modified to increase the rate of sulfur trioxide condensation on ash particles as they pass through the air preheater and continue to travel downstream.

21. The method of claim 16, further comprising modeling various parameters of the combustion system.

22. The method of claim 21, wherein the parameters include temperature patterns, rates of reaction of components, and condensation reactions of pollutants.

23. The method of claim 22, wherein the parameters include the geometry of the combustion system.

24. The method of claim 21, further comprising using the modeled parameters to determine optimal concentration and size of the particles to be injected.

25. The method of claim 16, wherein the gas phase pollutants captured in the combustion system include at least one member selected from the group consisting of sulfur trioxide, mercury, and other volatile elements, inorganic and organic compounds.

26. A method of capturing gas phase pollutants in a combustion system downstream of a combustion zone comprising the steps of:
   predicting the temperature gradient and location in the combustion system where the critical phenomena of condensation of the gas phase pollutants occur;
   using the predicted temperature gradient and location to determine optimal size distribution of particles and locations to inject particles into the combustion system to enhance heterogeneous condensation of gas phase pollutants onto injected particles; and
   injecting particles into the combustion system at one or more of the determined locations.

27. The method of claim 26, wherein the critical phenomena are enabled by providing zones in the combustion system with a temperature gradient chosen such that a temperature shift occurs from above the dew point of a particular gas phase pollutant to below its dew point and with sufficient nucleation sites present for the condensation reaction of the particular gas phase pollutant to occur.

28. The method of claim 27, wherein the size distribution of the injected particles is chosen such that the injected particles provide sufficient nucleation sites for the condensation reaction to occur, and can be captured in a subsequent particulate control system in the combustion system.

29. The method of claim 26, wherein the gas phase pollutants include sulfur trioxide.

30. The method of claim 26, wherein the material of the injected particles is chosen such that it neutralizes the acidity of the sulfur trioxide.

31. The method of claim 30, wherein the material of the injected particles is selected from the group consisting of fly ash, finely ground minerals, alkali compounds, alkaline-earth compounds, aerosols, and aqueous solutions of salts and mists.

32. The method of claim 26, wherein the temperature gradient is achieved by an air preheater that is modified or operated to increase the rate of sulfur trioxide condensation on ash particles as they pass through the air preheater and continue to travel downstream.

33. The method of claim 26, further comprising determining optimal concentration and size of the particles to be injected.

34. The method of claim 26, wherein the locations are determined such that pollutant condensation occurs primarily on the injected particles.

35. The method of claim 26, wherein the gas phase pollutants captured in the combustion system include at least one member selected from the group consisting of sulfur trioxide, mercury, and other volatile elements, inorganic and organic compounds.

36. The method of claim 26, further comprising modeling various parameters of the combustion system.

37. The method of claim 36, wherein the parameters include temperature patterns, rates of reaction of components, and condensation reactions.

38. The method of claim 37, wherein the parameters include the geometry of the combustion system.

39. The method of claim 26, wherein the combustion system includes a furnace.

* * * * *